United States Patent
Ohk (10) Patent No.: US 7,848,590 B2
(45) Date of Patent: Dec. 7, 2010

(54) IMAGE PROCESSING APPARATUS AND METHOD OF REMOVING REGIONS OR DIVIDING PORTIONS OF AN INPUT IMAGE TO REDUCE COMPUTATION

(75) Inventor: Hyung-soo Ohk, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 967 days.

(21) Appl. No.: 11/626,480

(22) Filed: Jan. 24, 2007

(65) Prior Publication Data

US 2008/0013857 A1     Jan. 17, 2008

(30) Foreign Application Priority Data

Jul. 14, 2006    (KR)    .................. 10-2006-0066532

(51) Int. Cl.
  *G06K 9/40*     (2006.01)
  *G06K 9/00*     (2006.01)
  *G03F 3/08*     (2006.01)

(52) U.S. Cl. ...................... 382/274; 382/173

(58) Field of Classification Search .......... 382/162, 382/164, 165, 167, 168, 173, 274; 358/1.9, 358/3.24, 3.26, 448, 463, 464, 474, 475, 358/488, 515, 516, 518, 530; 345/87, 96, 345/209, 426, 581, 613
See application file for complete search history.

(56) References Cited

U.S. PATENT DOCUMENTS

| | | | |
|---|---|---|---|
| 5,377,019 A | | 12/1994 | Okisu et al. |
| 5,400,153 A | * | 3/1995 | Schonenberg et al. ....... 358/516 |
| 5,677,776 A | | 10/1997 | Matsuda et al. |
| 5,751,267 A | * | 5/1998 | Sato et al. ..................... 345/96 |
| 6,124,950 A | | 9/2000 | Honda |
| 6,462,835 B1 | * | 10/2002 | Loushin et al. ............... 358/1.9 |
| 6,658,137 B1 | * | 12/2003 | Yuhara et al. ................ 382/104 |
| 6,950,141 B2 | * | 9/2005 | Mori et al. ................... 348/362 |
| 7,245,764 B2 | * | 7/2007 | Nishizawa ................... 382/168 |
| 2006/0007505 A1 | | 1/2006 | Chelvayohan et al. |
| 2006/0193533 A1 | | 8/2006 | Araki et al. |
| 2008/0013857 A1 | * | 1/2008 | Ohk .......................... 382/274 |

(Continued)

FOREIGN PATENT DOCUMENTS

EP        1093084        4/2001

(Continued)

OTHER PUBLICATIONS

Korean Notice of Allowance issued Feb. 12, 2010 in KR Application No. 2006-0066532.

(Continued)

*Primary Examiner*—Amir Alavi
(74) *Attorney, Agent, or Firm*—Stanzione & Kim, LLP (57) ABSTRACT

An image processing method includes determining one or more candidate pixels having variation of brightness in a first direction, among a plurality of pixels constituting an input image, the variation of brightness exceeding a first reference value, determining a certain region in which the total number of candidate pixels existing in a row of pixels in a second direction different from the first direction exceeds a second reference value, and generating an output image free from the determined certain region.

19 Claims, 9 Drawing Sheets

U.S. PATENT DOCUMENTS

2008/0089582 A1* 4/2008 Ohk .................. 382/167

FOREIGN PATENT DOCUMENTS

| EP | 1294174 | 3/2003 |
|---|---|---|
| JP | 05-225391 | 9/1993 |
| JP | 05-336341 | 12/1993 |
| JP | 06-078133 | 3/1994 |
| JP | 08-154166 | 6/1996 |
| JP | 2000-41141 | 2/2000 |
| JP | 2001-285606 | 10/2001 |
| KR | 2007-0009922 | 1/2007 |
| WO | WO 01/11864 | 2/2001 |

OTHER PUBLICATIONS

Korean Office Action issued May 25, 2009 in KR Application No. 10-2006-0066532.
European Search Report dated Sep. 26, 2007 issued in EP 07109288.6.

* cited by examiner

IMAGE PROCESSING APPARATUS AND METHOD OF REMOVING REGIONS OR DIVIDING PORTIONS OF AN INPUT IMAGE TO REDUCE COMPUTATION

CROSS-REFERENCE TO RELATED APPLICATIONS

This application claims priority under 35 U.S.C. §119(a) from Korean Patent Application No. 2006-0066532, filed on Jul. 14, 2006, the disclosure of which is incorporated herein by reference in its entirety.

BACKGROUND OF THE INVENTION

1. Field of the Invention

The present general inventive concept relates to an image processing apparatus and an image processing method, and more particularly, to an image processing apparatus and an image processing method, which are capable of removing a certain region of an input image or dividing a certain portion of the input image with a reduced computation and a high applicability.

2. Description of the Related Art

An image processing apparatus, such as a copier, a multi-function copier or the like, incorporates scanning an object to generate its image as a copy of the object, processing the generated image, and printing the processed image on a record medium such as a paper. Such image processing may be performed by a separate image processing apparatus.

Figure 1:
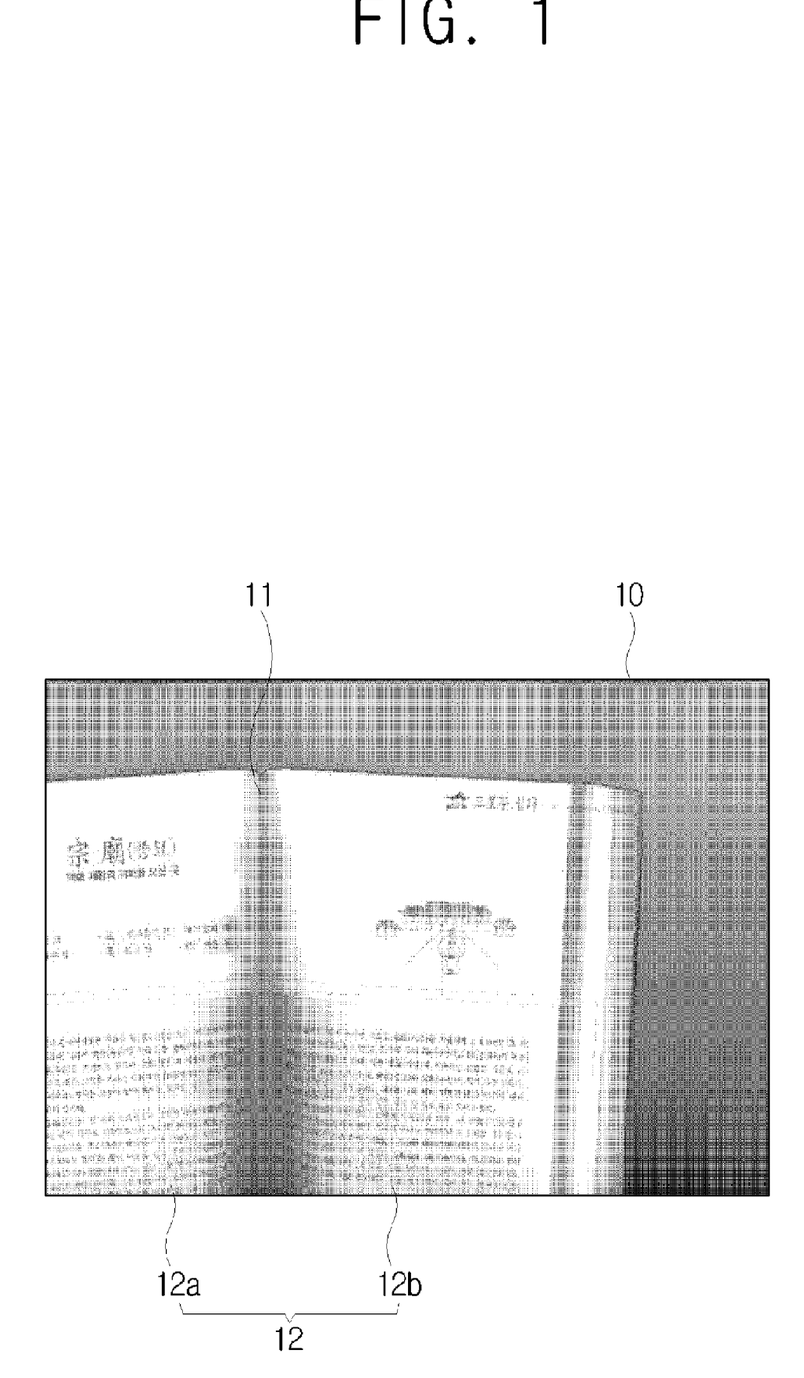
FIG. 1 is a view illustrating a scanned image having a folding line.

There are various objects that we can copy, and among them are books copied in two pages at the same time by unfolding them. In this case, a center line formed between the two pages is lifted up from a scan plane during scanning, so relatively less light reaches a region along the center line. Thus, the region comes out relatively darker, compared to other copied area of the two pages. In particular, a very middle line (hereinafter referred to as "folding line") comes out the darkest. An example of a folding line 11 is shown in FIG. 1.

It is desirable to remove a folding line image portion corresponding to a portion where substantial image distortion occurs. As one of conventional techniques for removing the folding line image, U.S. Pat. No. 6,330,050 discloses a conventional technique which estimates heights of portions on coordinates of an input image from a scan plane, and corrects a distortion of the image based on the estimated heights.

However, this technique has a problem in that a great deal of computation is required to estimate the heights and this technique is applicable only when the folding line is parallel to a scanner, that is, is perpendicular to a main scan direction.

SUMMARY OF THE INVENTION

The present general inventive concept provides an image processing apparatus and an image processing method, which are capable of removing a certain region of an input image or dividing a certain portion of the input image with a reduced computation and a high applicability.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing an image processing method including determining one or more candidate pixels having variation of brightness in a first direction, among a plurality of pixels constituting an input image, the variation of brightness exceeding a first reference value, determining a certain region in which a total number of candidate pixels existing in a row of pixels in a second direction different from the first direction exceeds a second reference value, and generating an output image free from the determined certain region.

The first and second directions may be horizontal and vertical directions of the input image, respectively.

The first reference value may be twice the variation of brightness in the vertical direction.

The second reference value may be equal to 80% of the total number of corresponding pixels in the row of pixels.

The determining of the one or more candidate pixels may further include determining a candidate pixel block comprising at least one candidate pixel among a plurality of 9*9 pixel blocks constituting the input image, and the determining of the certain region comprises determining the certain region in a unit of the candidate pixel block.

The image processing method may further include substituting the candidate pixel block for at least one pixel block arranged in the horizontal direction from the candidate pixel block.

The image processing method may further include generating the input image by scanning a copy object.

The image processing method may further include printing the generated output image on a record medium.

The generating of the output image comprises dividing the input image into two output images on the basis of the determined certain region.

The foregoing and/or other aspects of the present general inventive concept may also be achieved by providing an image processing apparatus including an image processing part that determines one or more candidate pixels having variation of brightness in a first direction, among a plurality of pixels constituting an input image, the variation of brightness exceeding a first reference value, and a certain region in which a total number of candidate pixels existing in a row of pixels in a second direction different from the first direction exceeds a second reference value, and generates an output image free from the determined certain region.

The first and second directions may be horizontal and vertical directions of the input image, respectively.

The first reference value may be twice the variation of brightness in the vertical direction.

The second reference value may be equal to 80% of the total number of corresponding pixels in the row of pixels.

The image processing part may determine a candidate pixel block comprising at least one candidate pixel among a plurality of 9*9 pixel blocks constituting the input image, and determines the certain region in a unit of candidate pixel block.

The image processing part may substitute the candidate pixel block for at least one pixel block arranged in the horizontal direction from the candidate pixel block.

The image processing apparatus may further include a scanning part that generates the input image by scanning a copy object.

The image processing apparatus may further include a printing part that prints the generated output image on a record medium.

The image processing part may generate the output image by dividing the input image into two output images on the basis of the determined certain region.

The foregoing and/or other aspects of the present general inventive concept may also be achieved by providing a computer readable recording medium to perform a method, the method including determining one or more candidate pixels having variation of brightness in a first direction, among a plurality of pixels constituting an input image, the variation of brightness exceeding a first reference value; determining a certain region in which a total number of candidate pixels existing in a row of pixels in a second direction different from the first direction exceeds a second reference value; and generating an output image free from the determined certain region.

The foregoing and/or other aspects of the present general inventive concept may also be achieved by providing an image processing apparatus including an image processing part to determine a region of an image as a folding line when the region includes one or more pixels having a predetermined brightness change and when the number of the one or more pixels is greater than a reference number, and to remove the region from the image to generate an output image.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
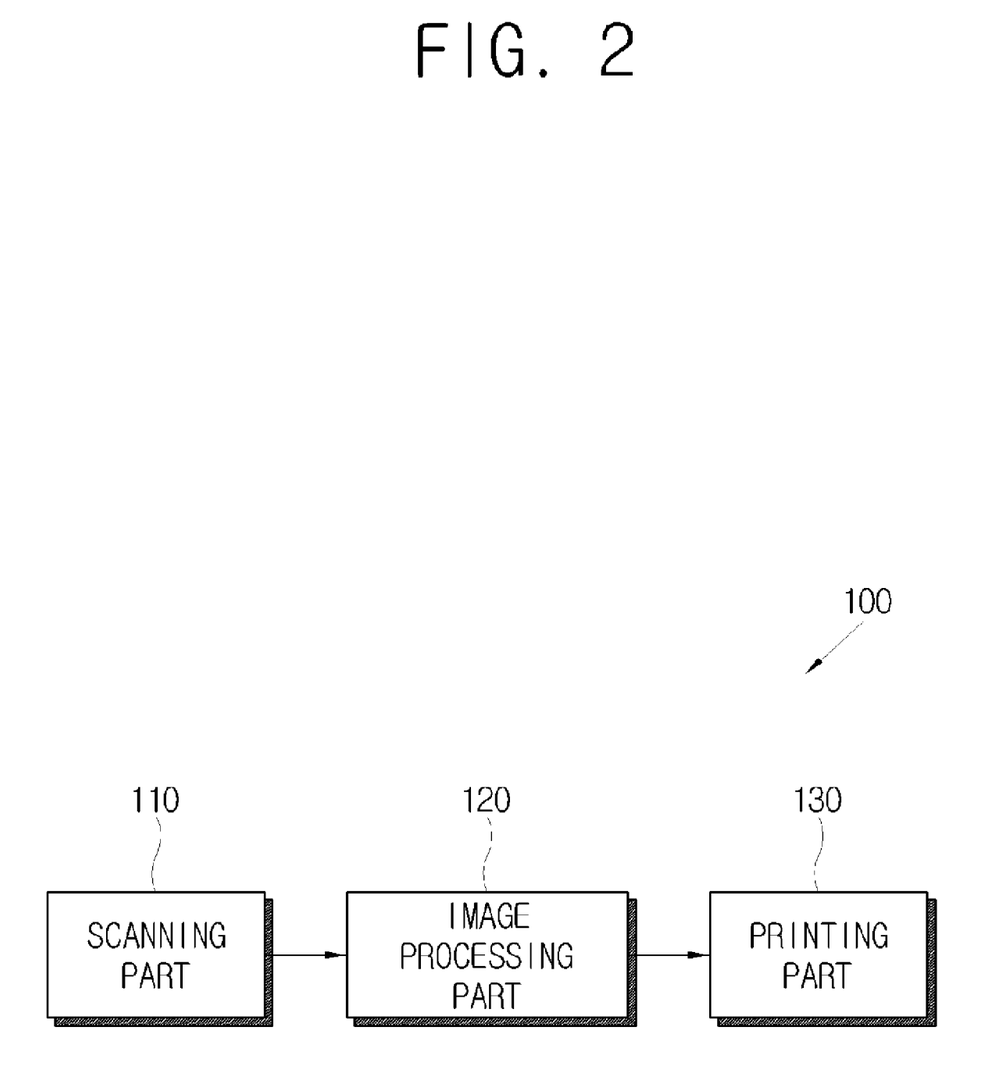
FIG. 2 is a block diagram illustrating an image processing apparatus according to an embodiment of the present general inventive concept.

FIG. 2 is a block diagram illustrating an image processing apparatus 100 according to an embodiment of the present general inventive concept. The image processing apparatus 100 may be embodied by a copier, a multifunction copier or the like.

Referring to FIG. 2, the image processing apparatus 100 may include a scanning part 110, an image processing part 120, and a printing part 130.

The scanning part 110 scans a copy object to generate its image having a plurality of pixels. In the present embodiment, a book will be considered as the copy object. The book contacts a scan plane (not shown) by unfolding two pages to be copied. In this case, a center portion between the two pages is lifted up above the scan plane, and other portions of the two pages may contact the scan plane. An example of an input image 10 generated by the scanning part 110 is illustrated in FIG. 1. The input image 10 includes page images 12 (12a and 12b) and a folding line 11 darkened between the page images 12a and 12b.

Referring to FIGS. 1 and 2, the image processing part 120 detects the folding line 11 out of the input image 10 generated by the scanning part 110 and processes the input image 10 to generate an output image free from the detected folding line 11. In the present embodiment, the folding line 11 is selected as an example of a "certain region" in the pages. The image processing part 120 removes the folding line 11 from the input image 10 to generate the output image including only the page images 12a and 12b. As an alternative embodiment, the image processing part 120 may divide the input image 10 on the basis of the folding line 11 and generate a first output image and a second output image corresponding to the page images 12a and 12b, respectively. In this case, the folding line 11 may be an example of a row of pixels having a sudden change in brightness as compared to adjacent pixels.

The printing part 130 prints the output image generated by the image processing part 120 on a record medium such as a paper. The printing part 130 may print the output image on one sheet of paper or may print the first and second output images on separate papers. The printing part 130 may perform at least one of various printing operations, for example, inkjet printing, laser printing, etc.

The image processing part 120 may be incorporated in a separate image processing apparatus (not shown) from the scanning part 110 and/or the printing part 130.

The image processing part 120 determines candidate pixels whose variations of brightness in a first direction exceed a first reference value, among a plurality of pixels that constitute the input image 10. In other words, the image processing part 120 detects the candidate pixels corresponding to an edge whose brightness suddenly changes in a horizontal direction in the input image 10. In the present embodiment, the horizontal direction refers to a direction substantially perpendicular to the folding line 11 and a vertical direction refers to a direction substantially parallel to the folding line 11.

The candidate pixels are determined by detecting the variations of brightness of pixels using conventional methods such as Sobel edge detection and so on. The image processing part 120 finds a horizontal and a vertical brightness gradient of pixels. The following Equation 1 and Equation 2 may be used to find the horizontal and vertical brightness gradients.

$$Gx=(\text{Image}(x-1,y-1)-\text{Image}(x-1,y)+\text{Image}(x-1,y+1)-\text{Image}(x+1,y-1)\text{Image}(x+1,y)+\text{Image}(x+1,y+1))/3 \quad \text{[Equation 1]}$$

$$Gy=(\text{Image}(x-1,y-1)-\text{Image}(x-1,y)+\text{Image}(x+1,y-1)-\text{Image}(x-1,y+1)-\text{Image}(x,y+1)+\text{Image}(x+1,y+1))/3 \quad \text{[Equation 2]}$$

Gx represents variations of brightness of pixels in an x-direction, i.e., a vertical direction, Gy represents variations of brightness of pixels in a y-direction, i.e., a horizontal direction, and Image(x,y) represents brightness of any pixel(x,y).

Figure 3:
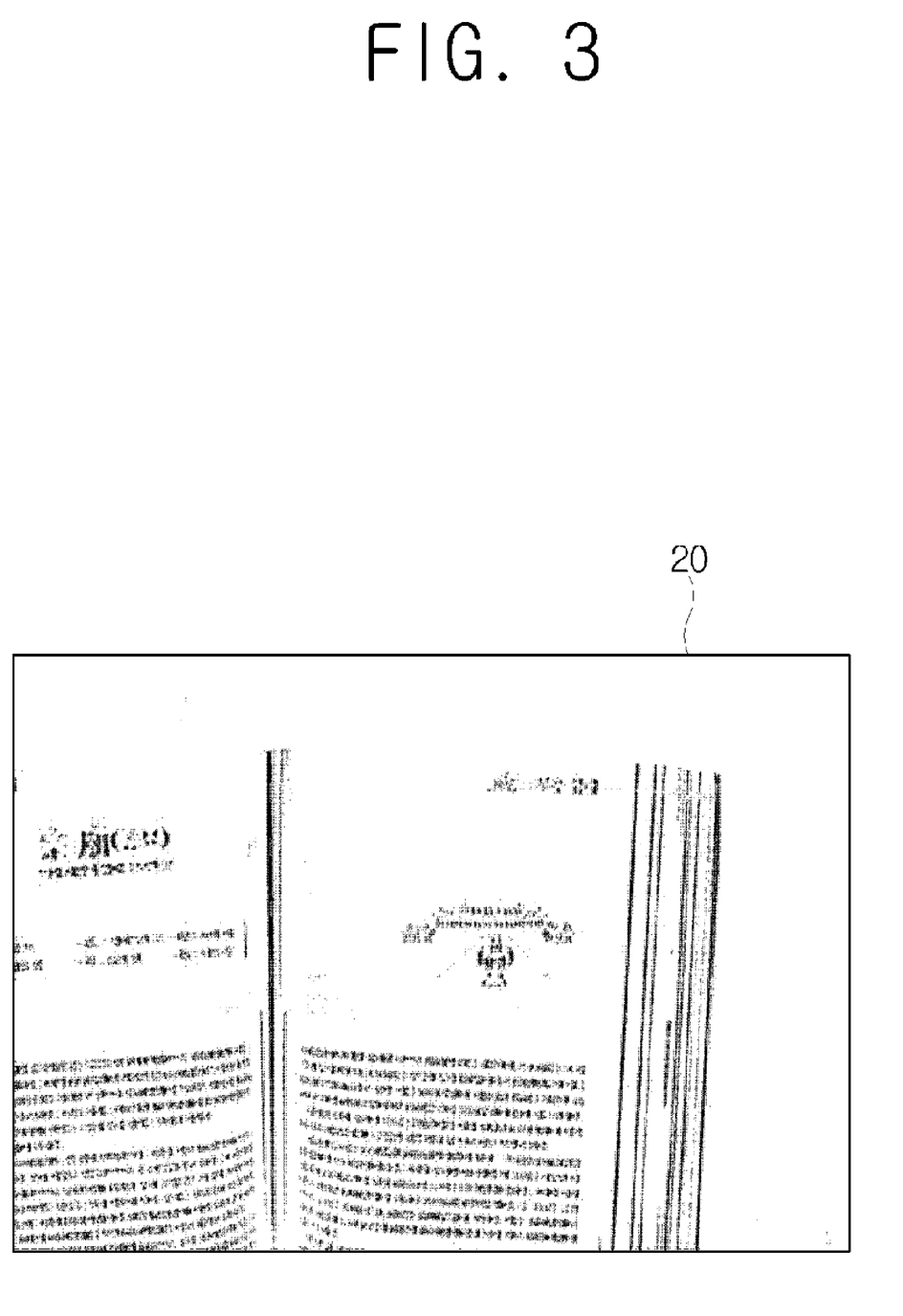
FIG. 3 is a view illustrating an edge map obtained in the image processing apparatus of FIG. 2 according to an embodiment of the present general inventive concept.

In addition, the image processing part 120 determines pixels whose variations of brightness in the horizontal direction exceed the first reference value, as the candidate pixels. In the present embodiment, the first reference value may be twice the variations of brightness of pixels in the vertical direction. For example, if Gy>Gx*2, that is, if the variations of brightness of pixels in the horizontal direction is more than twice the variations of brightness of pixels in the vertical direction, the image processing part 120 may determine the pixels as the candidate pixels. FIG. 3 illustrates an edge map 20 as a resultant image of the input image 10 of FIG. 1 which may be obtained when only the candidate pixels of the input image are dotted.

Figure 4:
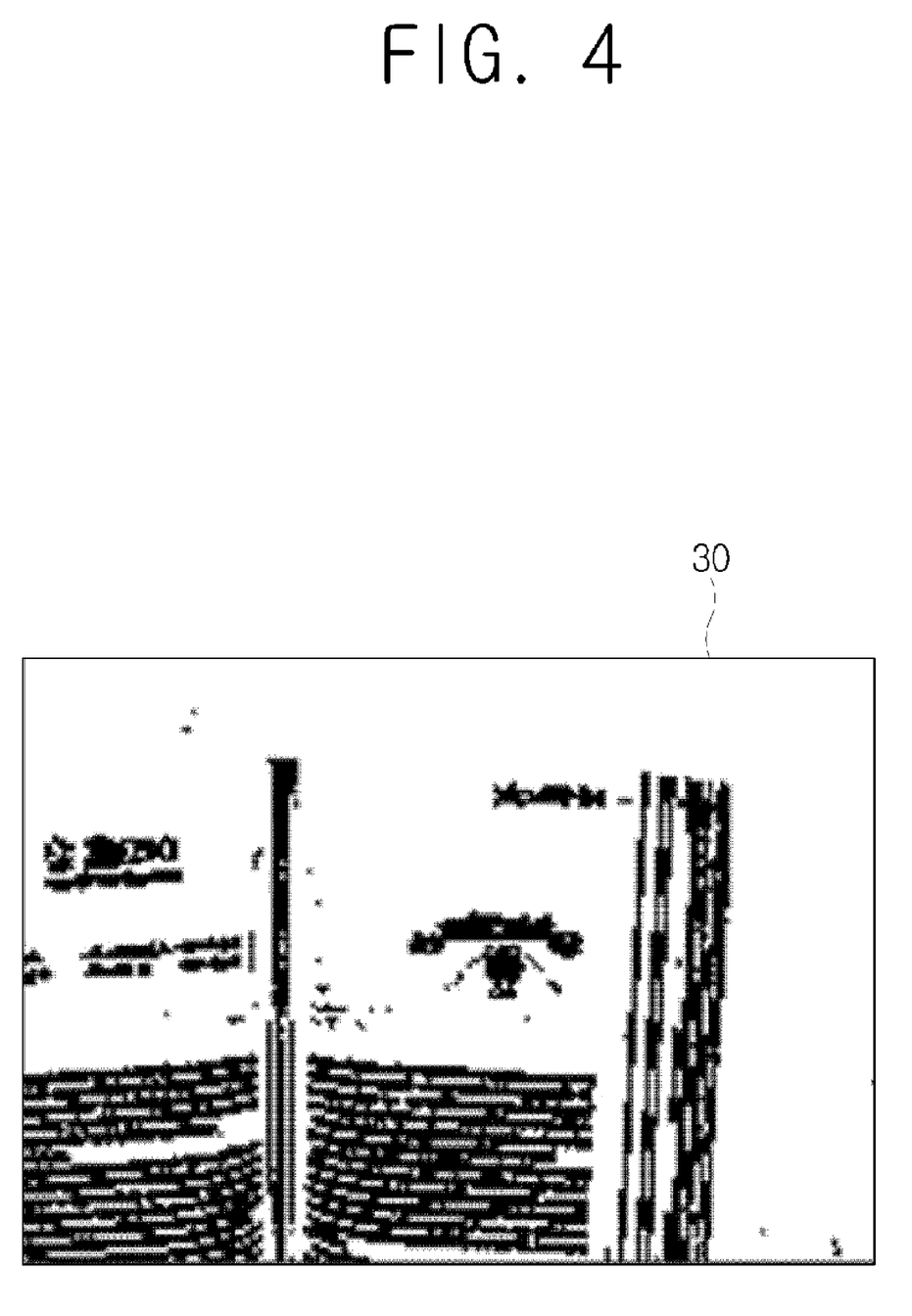
FIG. 4 is a view illustrating a sub-sampled image obtained in the image processing apparatus of FIG. 2 according to an embodiment of the present general inventive concept.

The edge map 20 may have noises depending on characteristics of the input image 10. The image processing part 120 may process the image in a unit of a pixel block, which is a set of adjacent pixels, not in a unit of a pixel, in order to minimize effects of the noises and increase a speed of calculation. This image processing is referred to as a sub-sampling. In the present embodiment, the unit of 9*9 pixel blocks is used. The image processing part 120 determines candidate pixel blocks, each including at least one candidate pixel, among the 9*9 pixel blocks. In this case, representative values of the candidate pixel blocks are set to be an on-state. FIG. 4 illustrates a sub-sampled image 30 of the input image 10 of FIG. 1 according to the sub-sampling image processing.

In the present embodiment, the image processing may be performed in either the unit of "pixel" or the unit of "pixel block." In the following description, the unit of "pixel" will be described by way of an example, but the unit of "pixel block" can be used for the image processing.

A peak value in the folding line may be reduced due to a skew which may exist in an actual image depending on environments where the input image is obtained or the copy object is scanned. This may lower the precision of detection of the folding line. Accordingly, the image processing part 120 dilates the sub-sampled image 30 in the horizontal direction, which is called morphological dilation.

Figure 5:
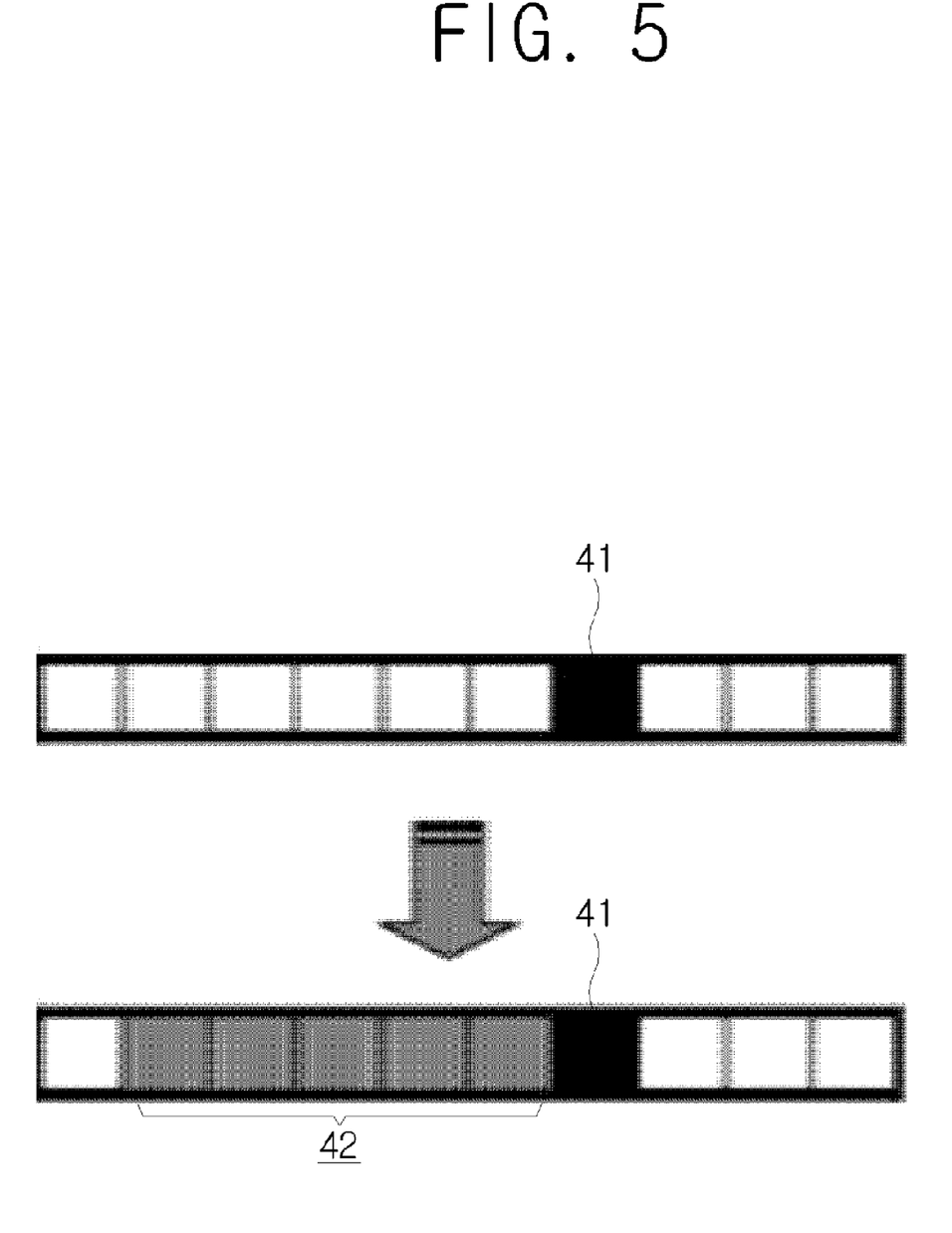
FIG. 5 is a view illustrating a dilation process of the image processing apparatus of FIG. 2 according to an embodiment of the present general inventive concept.
Figure 6:
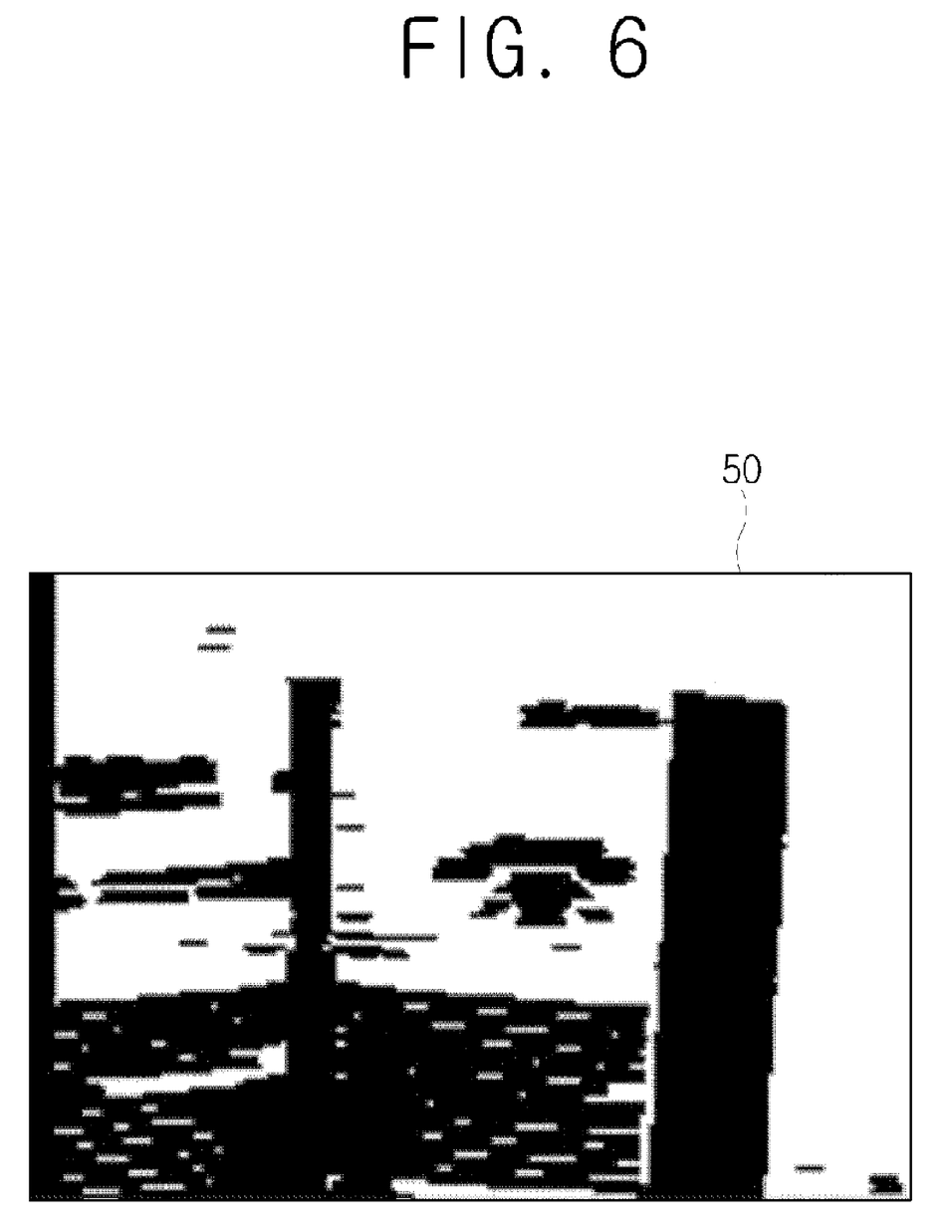
FIG. 6 is a view illustrating a generated image after the dilation process of FIG. 5 according to an embodiment of the present general inventive concept.

The image processing part 120 may substitute at least one pixel arranged parallel to a particular candidate pixel with a new candidate pixel. For example, as illustrated in FIG. 5, when a candidate pixel 41 is detected, the image processing part 120 determines five pixels 42 arranged in the left of the detected candidate pixel 41 as new candidate pixels. FIG. 6 illustrates an image 50 generated through the dilation process.

Figure 7:
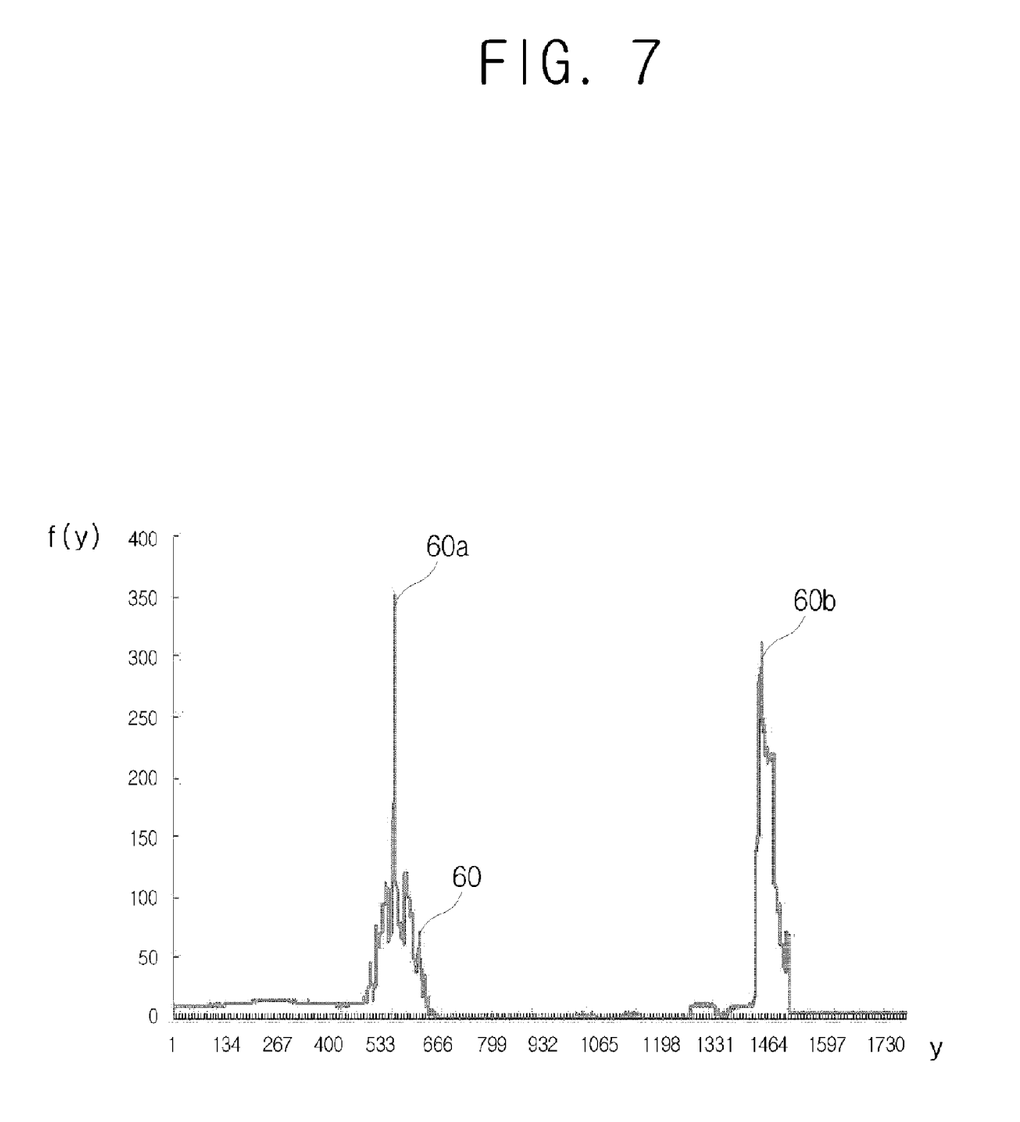
FIG. 7 is a graph illustrating a total number of pixels at a point on a y-axis of an image according to an embodiment of the present general inventive concept.

In order to detect the folding line 11, the image processing part 120 detects a portion where the number of candidate pixels in the vertical direction increases suddenly, that is, a region where the number of candidate pixels in the vertical direction reaches a peak. In other words, the image processing part 120 determines a region where the total number of candidate pixels existing in a row of pixels in the vertical direction exceeds a second reference value, as the folding line 11. The portion determined as the folding line 11 is removed from the input image to generate the output image. Alternatively, two images disposed opposite to each other with respect to the portion determined as the folding line 11 may be separated from the input image 10 to generate two output images. In the present embodiment, the second reference value may correspond to 80% of the total number of pixels in the row of pixels in the vertical direction. If the page images 12 do not extend throughout in the vertical direction, like the input image 10 illustrated in FIG. 1, the second reference value may be 80% of the total number of pixels in the row of pixels in the vertical direction within the page images 12. FIG. 7 is a graph 60 illustrating the total number f(y) of candidate pixels determined at a point i (i is a natural number) on a y-axis of an image.

As illustrated in FIG. 7, f(y) has its peaks 60a and 60b near the folding line and at an end portion of the book. In order to discriminate the peak 60a, which corresponds to the folding line 11, out of the two peaks 60a and 60b, the image processing part 120 may detect a region of the page images in the input image and then consider a positional relation of the detected region with the peaks. As an alternative embodiment, the image processing part 120 may discriminate the peak 60a corresponding to the folding line 11 in consideration of characteristics of an image before and after a peak.

Figure 8:
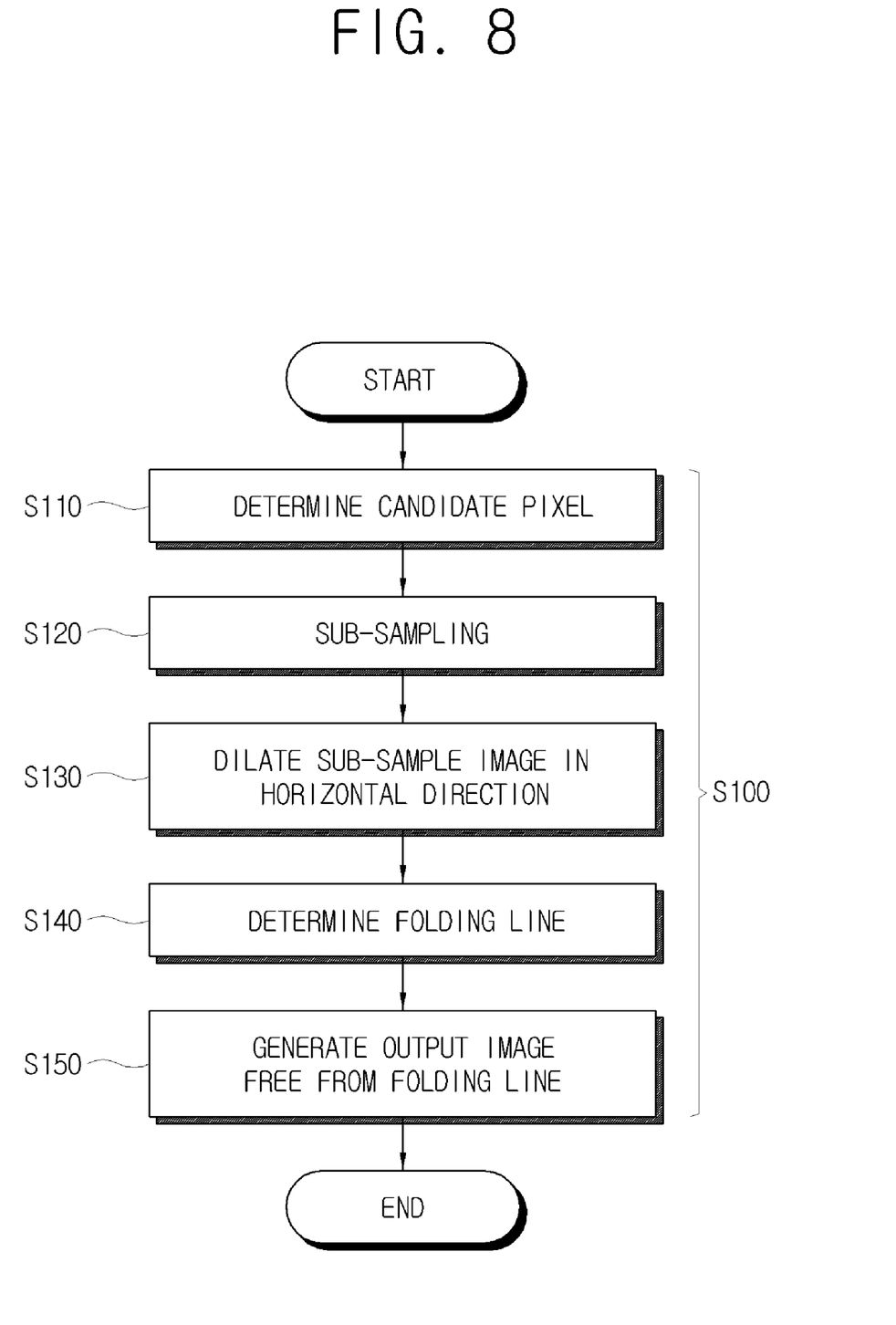
FIG. 8 is a flow chart illustrating an image processing method according to an embodiment of the present general inventive concept.

FIG. 8 is a flow chart illustrating an image processing method according to an embodiment of the present general inventive concept. Referring to FIG. 8, with respect to a plurality of pixels constituting an input image, variations of brightness of pixels in a horizontal direction are compared with variations of brightness of pixels in a vertical direction, and then, based on the comparison, candidate pixels whose brightness changes suddenly are determined at operation S110.

Next, at operation S120, sub-sampling is performed on an image in which only the candidate pixels determined at the operation S110 are dotted in order to minimize effects of noises and reduce the amount of computation. Next, at operation S130, morphological dilation is performed on the image sub-sampled at the operation S120 in order to minimize an effect of a skew or the like.

Next, with respect to the image obtained at the operation S130, a folding line in which the number of candidate pixels increases suddenly in the vertical direction is determined at operation S140. Next, an output image free from the folding line determined at the operation S140 is generated at operation S150.

As an alternative embodiment, with respect to the image obtained at the operation S130, a row in which the number of candidate pixels increases suddenly in the vertical direction may be determined, and then, an input image may be divided based on the determined row of pixels to generate an output image at operation S150.

Figure 9:
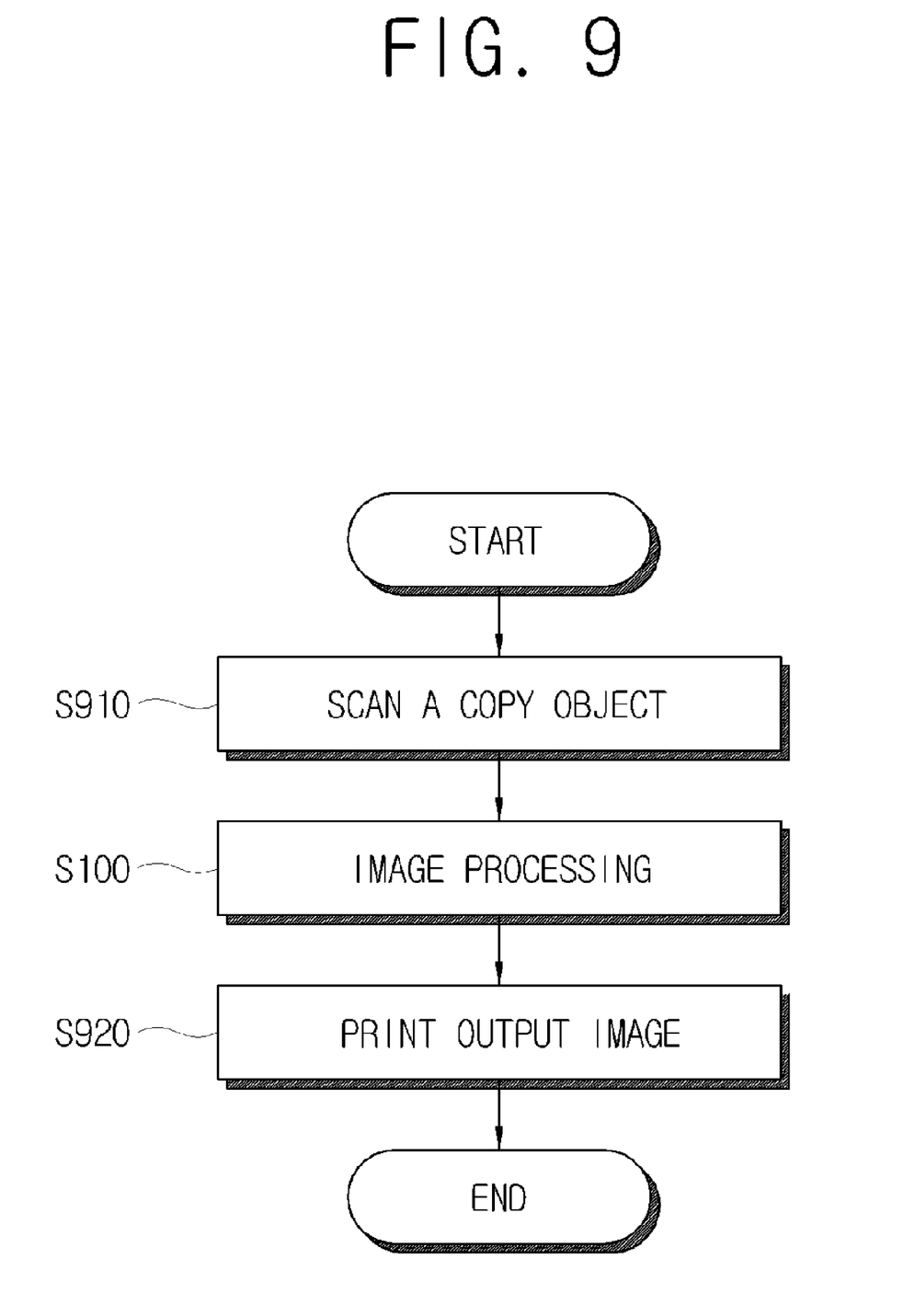
FIG. 9 is a flow chart illustrating an image processing method of an image processing apparatus according to an embodiment of the present general inventive concept.

As another alternative embodiment, the image processing method may further include an operation S910 of scanning a copy object to generate an input image before the operation S100 of FIG. 8, and an operation S920 of printing the generated output image on a record medium such as a paper after the operation S100 of FIG. 8, as illustrated in FIG. 9.

The present general inventive concept can also be embodied as computer-readable codes as a program on a computer-readable recording medium to perform the above-described method. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

As described above, the present general inventive concept provides an image processing apparatus and an image processing method, which are capable of removing a certain region of an input image with little amount of computation and high applicability.

In addition, according to the present general inventive concept, it is possible to divide and print page images in an input image through detection of a folding line of a book.

In addition, according to the present general inventive concept, by performing sub-sampling, an image robust to noises can be generated and the amount of computation for process of the image can be further reduced.

Furthermore, according to the present general inventive concept, by performing morphological dilation, a certain region of an image can be discriminated more precisely.

For example, although the folding line has been illustrated as the certain region in the above embodiments, the certain region may be circumferences of right and left pages of a book, which come out relatively darker, compared to other regions of the pages. In this case, candidate pixels may be determined in consideration of sudden change of brightness of pixels in both of the horizontal and vertical directions.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image processing method comprising:
   determining with a processor of an image processing apparatus one or more candidate pixels having variation of brightness in a first direction, among a plurality of pixels constituting an input image, the variation of brightness exceeding a first reference value;
   determining a certain region in which a total number of candidate pixels existing in a row of pixels in a second direction different from the first direction exceeds a second reference value with the processor of the image processing apparatus; and
   generating an output image free from the determined certain region with the processor of the image processing apparatus.

2. The image processing method according to claim 1, wherein the first and second directions are horizontal and vertical directions of the input image, respectively.

3. The image processing method according to claim 2, wherein the first reference value is twice the variation of brightness in the vertical direction.

4. The image processing method according to claim 2, wherein the second reference value is equal to 80% of the total number of corresponding pixels in the row of pixels.

5. The image processing method according to claim 1, wherein the determining of the one or more candidate pixels comprises:
   determining a candidate pixel block comprising at least one candidate pixel among a plurality of 9*9 pixel blocks constituting the input image with the processor of the image processing apparatus; and
   the determining of the certain region comprises determining the certain region in a unit of the candidate pixel block with the processor of the image processing apparatus.

6. The image processing method according to claim 5, further comprising:
   substituting the candidate pixel block for at least one pixel block arranged in the horizontal direction from the candidate pixel block with the processor of the image processing apparatus.

7. The image processing method according to claim 1, further comprising:
   generating the input image by scanning a copy object with a scanner of the image processing apparatus.

8. The image processing method according to claim 7, further comprising:
   printing the generated output image on a record medium with a printer of the image processing apparatus.

9. The image processing method according to claim 1, wherein the generating of the output image comprises dividing the input image into at least two output images on the basis of the determined certain region with the processor of the image processing apparatus.

10. An image processing apparatus comprising:
    an image processing part that determines one or more candidate pixels having variation of brightness in a first direction, among a plurality of pixels constituting an input image, the variation of brightness exceeding a first reference value, and a certain region in which a total number of candidate pixels existing in a row of pixels in a second direction different from the first direction exceeds a second reference value, and generates an output image free from the determined certain region.

11. The image processing apparatus according to claim 10, wherein the first and second directions are horizontal and vertical directions of the input image, respectively.

12. The image processing apparatus according to claim 11, wherein the first reference value is twice the variation of brightness in the vertical direction.

13. The image processing apparatus according to claim 11, wherein the second reference value is equal to 80% of the total number of corresponding pixels in the row of pixels.

14. The image processing apparatus according to claim 10, wherein the image processing part determines a candidate pixel block comprising at least one candidate pixel among a plurality of N by N pixel blocks constituting the input image, N being a natural number, and determines the certain region in a unit of candidate pixel block.

15. The image processing apparatus according to claim 14, wherein the image processing part substitutes the candidate pixel block for at least one pixel block arranged in the horizontal direction from the candidate pixel block.

16. The image processing apparatus according to claim 10, further comprising:
    a scanning part that generates the input image by scanning a copy object.

17. The image processing apparatus according to claim 10, further comprising:
    a printing part that prints the generated output image on a record medium.

18. The image processing apparatus according to claim 10, wherein the image processing part generates the output image by dividing the input image into at least two output images on the basis of the determined certain region.

19. A non-transitory computer readable recording medium containing computer readable codes as a program to perform an image processing method, the image processing method comprising:
    determining one or more candidate pixels having variation of brightness in a first direction, among a plurality of pixels constituting an input image, the variation of brightness exceeding a first reference value;
    determining a certain region in which a total number of candidate pixels existing in a row of pixels in a second direction different from the first direction exceeds a second reference value; and
    generating an output image free from the determined certain region.

* * * * *